W. Osborn.
Pressing
No. 2288. Reissued. June 19. 1866.
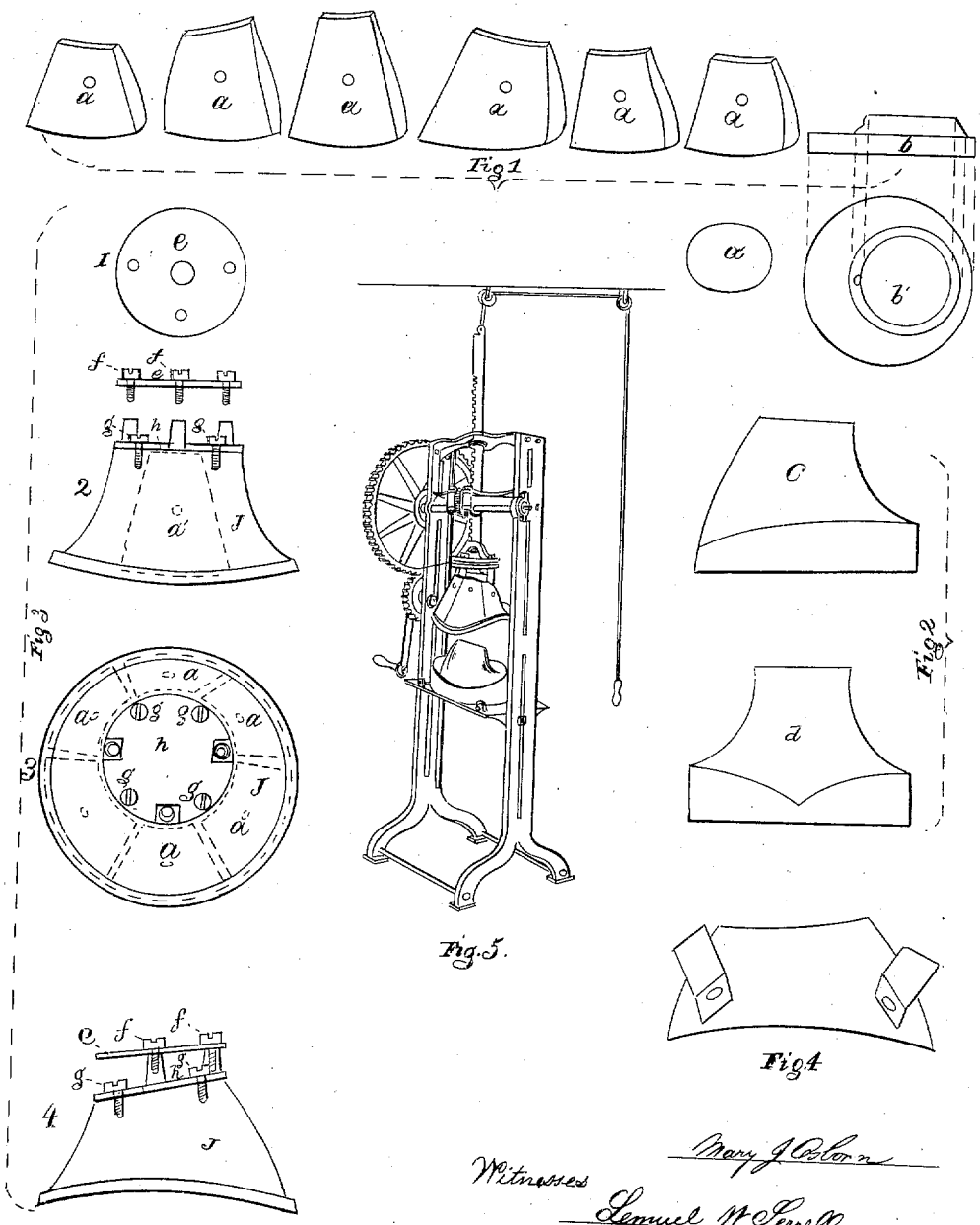
Witnesses
Mary J. Osborn
Samuel W. Serell
Thos. Geo Harold

UNITED STATES PATENT OFFICE.

W. E. DOUBLEDAY, OF BROOKLYN, AND J. STEWART, OF NEW YORK, N. Y., ASSIGNEES, BY MESNE ASSIGNMENTS, OF WM. OSBORN.

IMPROVEMENT IN MACHINES FOR PRESSING BONNETS, BONNET-FRAMES, &c.

Specification forming part of Letters Patent No. 15,570, dated August 19, 1856; Reissue No. 427, dated February 17, 1857; Reissue No. 933, dated March 27, 1860; Reissue No. 2,288, dated June 19, 1866.

*To all whom it may concern:*

Be it known that WILLIAM OSBORN, of Louisville, in the county of Jefferson and State of Kentucky, did invent a certain new and useful Improvement in the Manufacture of Bonnets, Bonnet-Frames, and similar articles to be worn upon the head, and that WILLIAM E. DOUBLEDAY, of Brooklyn, in the county of Kings and State of New York, and JOHN STEWART, of the city and State of New York, are the assignees of the entire right in said Letters Patent; and the following is hereby declared to be a full, clear, and exact description of the said invention.

Bonnets and similar articles had, previous to the invention of said OSBORN, been formed or shaped in detail. The tips and side bands composing the crown had been separately stretched, formed, or shaped between heated dies, and the flaring face-piece had been formed separately in a similar manner, and afterward these separate parts were united at another operation, usually by a heated iron in the operator's hands. Thus the making of bonnets, frames, or similar articles was accomplished by three operations: First, the making of the front or flaring face-piece or brim; second, the making of a tip and side band composing a crown; third, the joining by hand of the parts thus made separately, in order to form a complete article. Bonnets of straw and similar material had before been made by sewing the braids or pieces together, moistening, and then pressing by means of an iron or by means of a die—if by the iron, the surface was passed over progressively; if by the die, only certain portions and not the whole surface of the bonnet or similar article.

The nature of this division of the invention of the said OSBORN consisted in a pair of dies constructed in such a manner as to press upon the whole of the surface of the bonnet, bonnet-frame, or similar article to be worn upon the head, and at one operation give to the same the shape or form of the dies themselves.

In the drawings a mechanism is represented for actuating such dies.

Figure 5 is a perspective view of the dies and press.

Fig. 1, *a a a a a a* are heaters to be placed all around the side of the upper die. The small heater *a'* is the one that goes on the top of the upper die to heat the tip of said upper die. *b b'* is the heater for the block or lower die.

Fig. 2, *c* and *d* are front and side views of the block or lower die.

Fig. 3, No. I, *e* is a round iron plate attached by screws *f f f* to lugs on top of die J, No. II. The plate *e* has a bolt through the center, and is attached by said bolt to a plate at the lower end of the rack-shaft. There are four screws through the plate, attached to the lower end of the rack-shaft to adjust the upper die, J.

*h* is the top plate, attached by screws *g g g* to the top of the die J, forming the tip of the same to press the tip of the bonnet or bonnet-frame or similar article.

Fig. 3, No. III, is a top view of the plate *h* and die J, with heaters. No. IV is a side view, showing front and back of upper die, J.

Fig. 4 is the case which covers the heaters of upper die, J. By varying the shape of the dies the above-described apparatus will press all kinds of bonnets and bonnet-frames or similar articles of every size and shape.

The block or lower die may be made of marble or any other material that will not rust from the acids which may be in the articles and discolor them.

The upper die may be made of cast-iron or other material, so arranged with a rim or flange around the lower edge as to hold heaters all around it to make it hot enough to press the articles. The lower block or die stands upright on an iron bed-plate, and is secured by screws to keep it in place.

The bonnet, bonnet-frame, or similar article is put upon the lower die, and the upper die is lowered onto it by the crank or other mechanism, and it is pressed by one impression, or, in other words, is pressed all over at the same time. The bonnet, frame, or similar article can be made either with the front and side crown in one piece or in two pieces. If in two pieces, they are both formed at once and stuck together at the sides and top at one impression, and in cases where the shape is such that the bonnet, frame, or similar article can be formed of one piece of material, including the flaring face-piece, side crown, and tip, the same can be pressed in the dies the same as bonnets.

On the block or lower die there are two small steel pins about a quarter of an inch in length made fast to said block The pins have sharp points and stand vertically in the lower die. When the bonnet-frame is put on the lower die the pins stick through the corners of the material and hold the same in place until the tip and side crown are put on the lower die. The upper die is then lowered, which upper die has two holes in it to receive the pins on the lower die, and at one impression the frame is made. The result is the same whether the front, side crown, and tip are in one, two, or three pieces. It makes no difference with the machine; it works as well in the one case as in the other.

What is claimed as the invention of the said OSBORN is—

A pair of dies fitted to press the whole of a bonnet, frame, or similar article to be worn upon the head at one operation, substantially as specified, whether said bonnet, frame, or similar article is formed of one or of several pieces, and irrespective of the particular size or shape.

In witness whereof we have hereunto set our signatures this 27th day of March, A. D. 1866.

WM. E. DOUBLEDAY.
JOHN STEWART.

Witnesses:
CHAS. H. SMITH,
GEO. D. WALKER.